United States Patent
Causer et al.

[15] 3,698,819
[45] Oct. 17, 1972

[54] SCANNING LIGHT DETECTORS

[72] Inventors: Roy Causer, Wantage; John Farren, Abingdon; Terence Leslie Jones, Wantage; Brian Leslie Taylor, Newbury; Ronald Kerry Webster, North Oxford, all of England

[73] Assignee: United Kingdom Atomic Energy Authority, London, England

[22] Filed: March 5, 1970

[21] Appl. No.: 16,677

[30] Foreign Application Priority Data

March 7, 1969 Great Britain..........12,315/69

[52] U.S. Cl.........................356/203, 250/219 R
[51] Int. Cl............................G01n 21/22
[58] Field of Search....................356/201–203; 250/219 R

[56] References Cited

UNITED STATES PATENTS 3,424,534  1/1969  Miller et al. ..............356/203
3,563,656  2/1971  Helms......................356/96

Primary Examiner—Ronald L. Wibert
Assistant Examiner—F. L. Evans
Attorney—Larson, Taylor and Hinds

[57] ABSTRACT

For analyzing the exposed grain density of a photographic plate, light is shone through the plate onto a detector. A stepping motor drives a temperature compensated lead screw and nut arrangement to move the plate and light/detector relatively and give an automatic position indication. The detector output pulses define a time interval inversely proportional to the light intensity falling upon the detector. Drive stepping is automatically initiated upon completion of detector read out.

12 Claims, 9 Drawing Figures

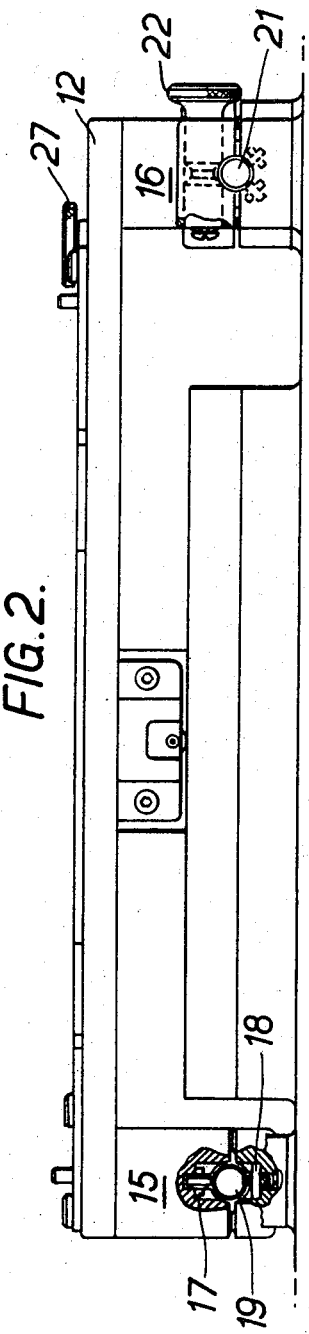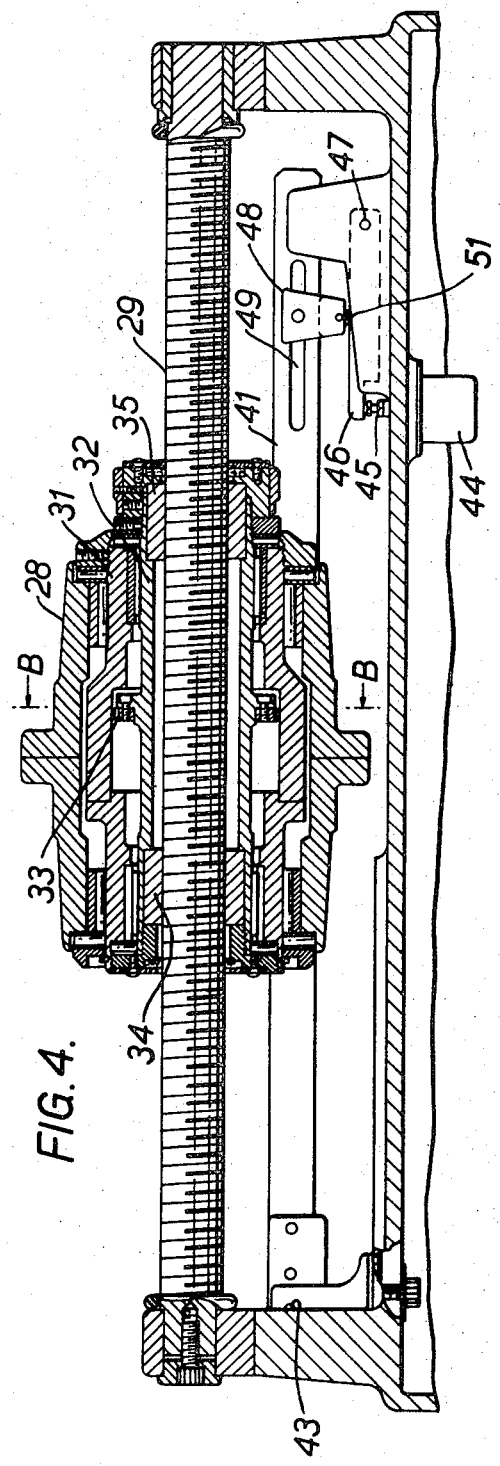

SCANNING LIGHT DETECTORS

BACKGROUND OF THE INVENTION

The invention relates to apparatus for detecting the light intensity received from a limited region of an object and for scanning an object so as to provide a correlated indication of position and received light intensity.

SUMMARY OF THE INVENTION

The invention provides apparatus comprising a detector device which produces an electrical signal output indicative of the intensity of light received by the device from a limited region of an appropriately positioned object near the detector device, drive means for causing step-by-step relative movement between the object and the detector device so that the detector device scans the object, and counter means for counting the steps to provide an indication of the position on the object of the region from which the detector device is receiving light, the said electrical signal output comprising electrical pulses defining a time interval which is related to the light intensity and provides the said indication thereof.

In one arrangement according to the invention, the time interval defined by the said electrical signal pulse is measured by means for counting reference electrical pulses received from a generator of electrical pulses with a time interval less than the shortest time interval defined by the electrical signal pulses likely to be generated by the said detector device. In this case, the drive means is conveniently activated, for initiating a step movement, by electrical signal pulses. Preferably each electrical signal pulse also initiates read out from a counter counting pulses from the reference pulse generator.

In another arrangement according to the invention, the inverse of the time interval defined by the said electrical signal pulses is measured by means for counting the number of said electrical signal pulses occurring in a predetermined time period, for example that time between pulses derived from a constant frequency electrical reference pulse generator. In that case, the drive means is preferably activated, for initiating a step movement, by the reference pulses.

In a preferred arrangement according to the invention, the apparatus is for providing an indication of the exposed grain density of a photographic plate and comprises a light source arranged so that a photographic plate may be interposed between the light source and the detector device.

Preferably the drive means comprises a stepping motor preferably adapted for rotating a nut on a lead screw. The nut may be coupled to the detector device for driving the detector device stepwise over a support for an object to be scanned. Alternatively, the nut may be coupled to the support for driving an object stepwise relative to the detector device.

Preferably temperature responsive means is coupled to the lead screw and nut arrangement for compensating the movement against expansion/contraction effects of ambient temperature variations.

BRIEF DESCRIPTION OF THE DRAWINGS

Specific constructions of apparatus embodying the invention will now be described by way of example and with reference to the accompanying drawings, in which:

FIG. 2 is a view, with some parts omitted, in the direction of arrow A in FIG. 1, FIG. 4 is a sectional view, with some parts omitted, on the line E—E of FIG. 1.

DESCRIPTION OF PREFERRED EMBODIMENTS

Figure 1:
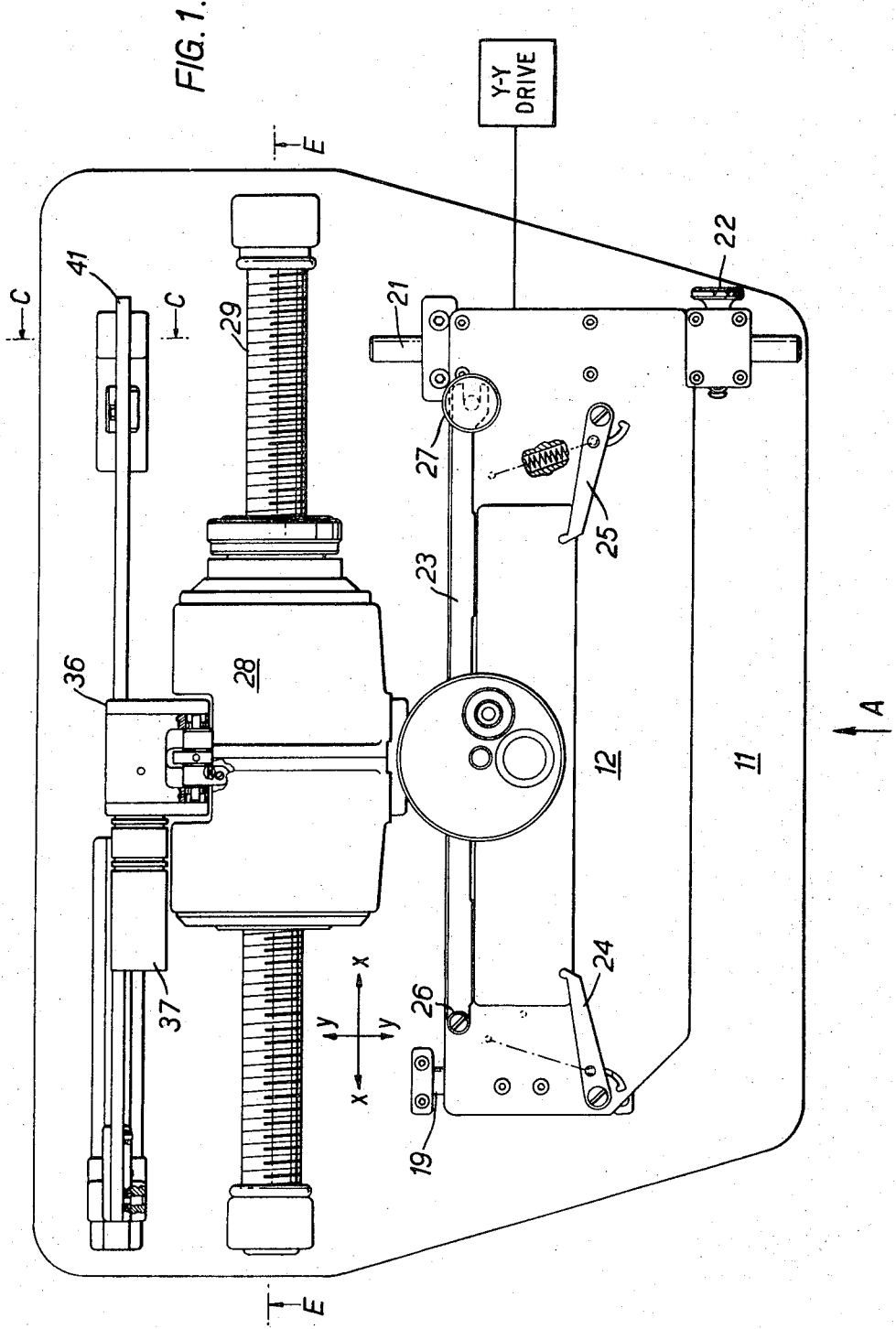
FIG. 1 is a plan view of an apparatus with a single light detector device.
Figure 3:
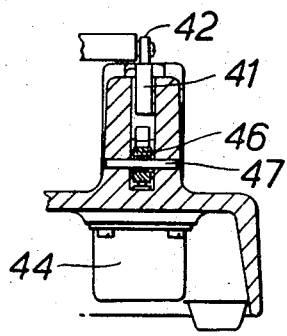
FIG. 3 is a partial sectional view on line C—C of FIG. 1.

In this example, the apparatus is for automatically reading the exposed grain density of a photographic plate and has particular application to the analysis of photographed spectra. Drive for scanning a photographic plate is provided by a stepping motor so that an indication of position on the plate is provided by counting the drive pulses to the stepping motor. An indication of exposed grain density is achieved by measuring the light transmitted through a small region of the plate under examination from a light source supplied from a stabilized power supply.

Referring to FIGS. 1–6, the apparatus comprises a base 11 on which is mounted a table 12 for supporting a photographic plate between a light source mounted in a support 13 (see FIG. 5) and an integrating light detector mounted in a support 14.

At each side, the table 12 has legs 15, 16 respectively which house roller bearings 17, 18 by which the table 12 is accurately located upon shafts 19, 21 while being free to roll upon the shafts in the direction of their length. In the leg 16 a transverse split shaft with a knurled knob 22 on one end has tapered surfaces which clamp the shaft 21 between them. Thus the table 12 may be moved in either direction along the lengths of the shafts 19 and 21 by rotation of the knurled knob 22.

A photographic plate is located on the table 12 between a back rest 23 and spring loaded arms 24 and 25. The back rest 23 eccentric pivoted at one end 26 and engages with an eccentric rotatable knob 27 at the other end. The knob 27 is rotated to make fine adjustments of the alignment of the photographic plate.

The supports 13 and 14 for the light source and light integrating detector respectively are secured to the main housing 28 of a drive assembly supported on a lead screw 29.

Within the main housing 28 is a hollow intermediate housing 31 and within the hollow intermediate housing 31 is hollow inner housing 32. As may be seen from FIG. 4, there are longitudinal and thrust bearings between each of the housings 28, 31 and 32 at each end.

The inner housing 32 has mounted centrally upon it a final drive gear 33 and at each end the housing 32 engages with nuts 34 and 35 respectively. The lead screw 29 is clamped at each end so that rotation of the inner housing 32 rotates the nuts 35 upon the lead screw 29 and drives the whole unit along the lead screw 29.

Figure 6:
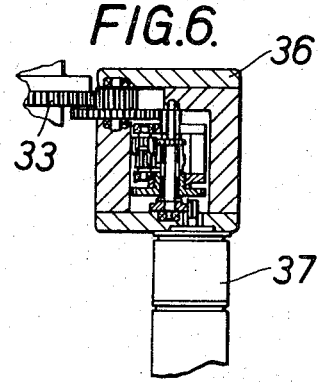
FIG. 6 is a partial section on the line E—E of FIG. 5.

Secured to the intermediate housing 31 is a gearbox housing 36 (see FIGS. 5 and 6) enclosing a gear train including a planetary gear shown in FIG. 6. Mounted on the gearbox housing 36 is a stepping motor 37 which provides input drive to the gear train the output from which drives the final gear 33.

As the position of the light detector in support 14 relative to the photographic plate is determined by counting the number of step pulses supplied to stepping motor 37, an important feature of the apparatus of this example is to provide compensation for variations in the length of lead screw 29 with variations in ambient temperature. Adjustment is effected by small bodily movement of the whole of the intermediate housing 31 and gearbox housing 36 around the inner housing 32. A bobbin 38 and coil spring 39 arrangement biases the gearbox housing 36 towards a lever arm 41 which is engaged by a roller 42 mounted on the gearbox housing 36.

As may best be seen from FIG. 4, the lever arm 41 is pivoted at one end at 43 and is coupled at the other end to a temperature responsive device 44 the output from which comprises temperature dependent movement of a stud 45. The stud 45 acts upon one end of a lever arm 46 pivoted at its other end at 47. Movement of the lever arm 46 is transmitted to the main lever arm 41 by a link 48 having a screw extending through a slot 49 in the lever arm 41 and a nut by which it is clamped to the lever arm 41. The link 48 has a roller 51 by which it engages upon the lever arm 46. Adjustment of the amount of movement of the lever arm 41 for a given change in temperature may thus be effected by adjusting the position of the link 48 along the length of the slot 49.

Figure 7:
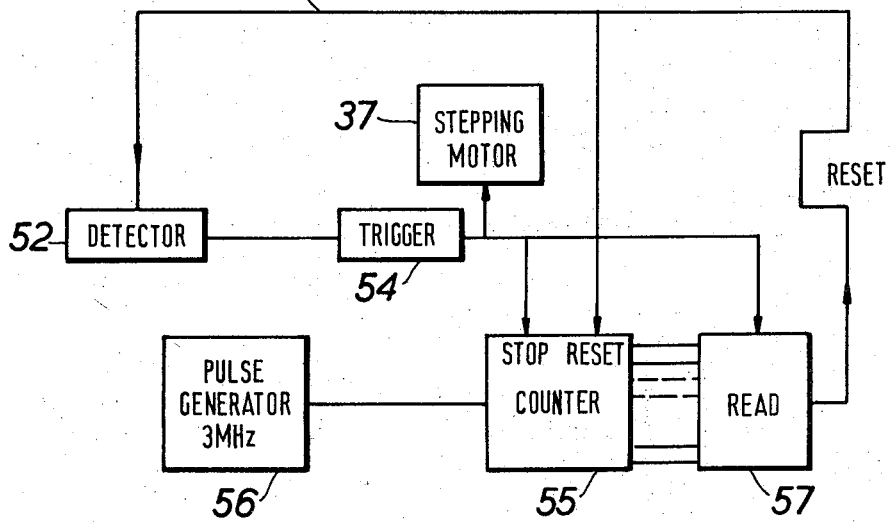
FIG. 7 is a block diagram of electrical components of the apparatus.
Figure 8:
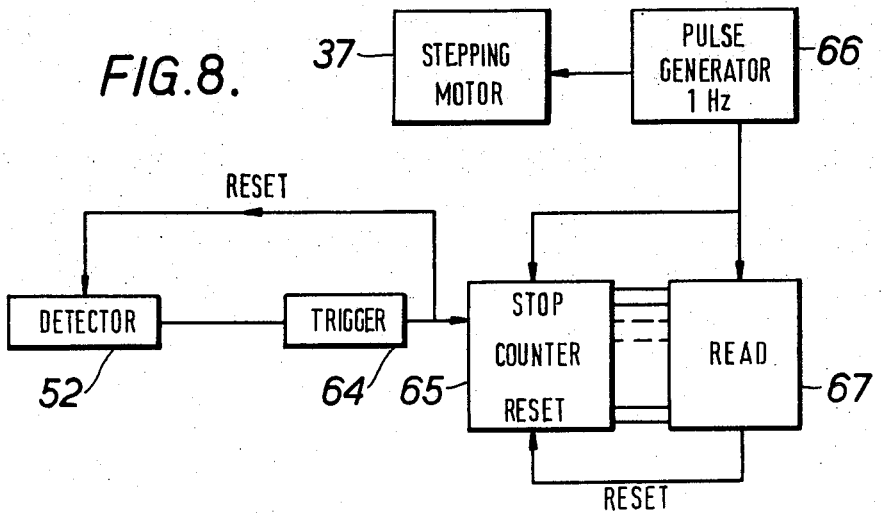
FIG. 8 is a block diagram of an alternative arrangement of electrical components of the apparatus.

The light integrating detector mounted in support 14 and shown at 52 in FIGS. 7 and 8 is a commercially available detector manufactured by the Plessey Company Limited and having the type specification O.P.T.1.

To operate the apparatus, a photographic plate is positioned and aligned on the table 12 and the drive unit is moved to position the support 14 so that the detector 52 receives light transmitted through the desired starting point on the photographic plate. Pulses are then supplied to the stepping motor 37 and the output of the detector 52 is monitored so that the apparatus provides automatically a continuous indication of position (by counting the stepping motor pulses) and of transmitted light intensity.

FIG. 7 illustrates a preferred arrangement of the electrical components for the apparatus with a single light detector 52. The detector 52 comprises a microcircuit having a combination of planar photodiodes and metal oxide silicon transistors (MOST) on a single chip. An input pulse charges up a planar diode to a predetermined reverse bias whereupon it discharges at a rate proportional to the light falling upon it. A MOST is used as the charging element as it is an almost perfect switch. In operation, when supplied with a continuously recurring input pulse, the device produces an output sawtooth waveform the decay rate of which is directly proportional to the light intensity. In practice, the output voltage of the device when fully charged is zero and this output voltage falls at a rate proportional to the light intensity.

Referring to FIG. 7, the detector is started by applying a pulse to the line 53. The trigger 54 is arranged to provide an output when the output from the detector 52 has fallen to a predetermined level. Simultaneously with applying a start signal to the detector 52 a counter 55 is set to count pulses from the pulse generator 56 which generates pulses at a constant frequency which, in this example, is 3 MegaHertz. An output from the trigger 54 has the following three effects:
1. to stop the counter 55;
2. to initiate supply of a single step pulse to the stepping motor 37, and
3. to initiate read out of the counter 55 by scaler 57.

The stepping motor 37 takes 5 milliseconds to start, 2.5 milliseconds to step and 5 milliseconds to stop, that is a total stepping time of 12.5 milliseconds. In this example, the scaler read out 57 is arranged to actuate a pen recorder and this takes longer than 12.5 milliseconds. It is therefore arranged that completion of read out provides a reset pulse on line 53 which resets the detector 52 and the counter 55 so that the cycle repeats.

It will be seen that each successive read out gives a number which is inversely proportional to the light falling upon the detector at each successive step of the motor 37.

FIG. 8 shows an alternative possible arrangement of the electrical components for the apparatus with a single light detector 52. In this arrangement, an output from trigger 64 immediately resets the detector 52. Thus, the output of the trigger 64 comprises a succession of pulses the pulse repetition frequency of which is proportional to the light intensity. Counter 65, scaler read out 67 and clock pulse generator 66 are arranged to measure this pulse repetition frequency from the output of trigger 64 by counting the pulses over a predetermined period. Conveniently, this is 1 second and provided by arranging for the clock pulse generator to generate pulses at a frequency of 1 Hertz. Pulses from the clock pulse generator 66 also drive the stepping motor 37 so that the step movements occur during read out.

The arrangement of FIG. 7 has a number of significant advantages over the arrangement of FIG. 8. Thus, the apparatus is primarily intended for providing an indication of the blackening of a photographic plate at a determined position along its length. The FIG. 8 arrangement effectively measures the pulse repetition frequency and the output counts are thus approximately inversely proportional to the blackening. The FIG. 7 arrangement, however, effectively measures the time interval between pulses and the count outputs are thus approximately directly proportional to the blackening.

Further, the stepping rate of the FIG. 7 arrangement is proportional to the light intensity. Thus, the apparatus steps more quickly over the light regions of the photographic plate than it does over the blackened regions. This is desirable as, in practice, it is usually the blackened regions in which one is interested.

With the arrangement of FIG. 8, the maximum pulse repetition frequency which the combination of detector 52 and trigger 64 can achieve, corresponding to maximum detected light intensity, is limited to 50 kiloHertz. This implies that the maximum numerical precision of the measurement will be 50,000:1. With the FIG. 7 arrangement on the other hand the time interval to be measured at maximum light intensity will be 20 microseconds (corresponding to a frequency of 50 kiloHertz) but this is measured using pulse generator at 3 MegaHertz which will give (nearly) 7 pulses in 20 microseconds. Thus the maximum numerical precision of the FIG. 7 arrangement would approach 350,000:1. While this difference may not be significant at maximum light intensity in view of the available accuracy of the detector 52, the difference is very significant at low light intensity.

The apparatus is particularly suitable for the analysis of emission spectra and mass spectra. In the emission spectrograph, the amount of light is substantially proportional to the concentration of the element and in the mass spectrograph, the number of ions is substantially proportional to the concentration of the element. The light and the ions are respectively made to blacken the photographic plate and the element concentration may be calculated from a measurement of the degree of blackening. For analyzing mass spectra, the apparatus is particularly convenient for it can be shown from the relationship between photographic blackening and the number of incident ions and the detection characteristic that the number of counts recorded in the FIG. 7 arrangement is substantially directly proportional to the element concentration of the element whose spectral line is being measured.

It is usual when photographing spectra to form up to 15 different exposures of the spectrum side by side upon a single photographic plate.

To facilitate analysis of such exposures, two alternative modifications to the aforedescribed apparatus have been proposed. In one modification the X direction stepwise drive is, as described above, applied to the light detector, but provision is made to drive the photographic plate on its support stepwise in the Y direction as shown schematically in FIG. 1. Thus a complete X-Y scan of a photographic plate may be carried out automatically.

Figure 5:
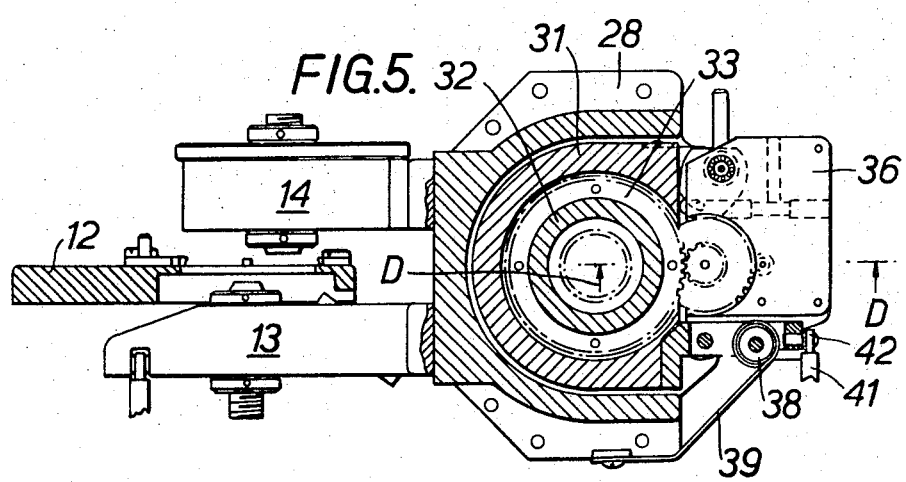
FIG. 5 is a partial sectional view on the line B—B of FIG. 4.
Figure 5A:
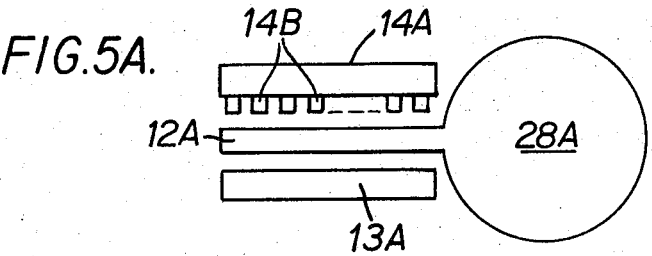
FIG. 5A is a sectional view similar to FIG. 5, but completely schematic in form and showing a modification of the invention.

In the other proposed modification, as shown schematically in FIG. 5A a plurality (e.g. 15) of light detectors 14B is provided in a single head 14A. Since such a head is more bulky than that of the example described above, the X direction stepwise drive is preferably applied to the plate support 12A.

Each detector is read in succession between each step of the drive system. This is achieved by the following modifications to the circuit arrangement shown in FIG. 7: the detectors are connected in parallel to the trigger circuit. The trigger circuit controls the counter and scaler read out in the same manner as illustrated in FIG. 7. However, control of reset pulses to the detectors and to the counter and of drive pulses to the stepping motor is provided by a sequence control unit under control of the scaler read out. The sequence control unit is connected by separate lines to the gates of each of the detectors and supplies a held resetting voltage level to all the gates. At each step, the sequence control successively removes this voltage level from the detector gates, on each occasion until the trigger circuit provides an output. The counter is reset simultaneously with release of the next detector in the succession and read out is initiated by the trigger circuit output. The resetting voltage to the detectors is restored immediately after it has been "read." In this way all the light detector outputs are read at each step. The next drive step is initiated by the sequence controller when read out from all detectors has been completed.

The invention is not restricted to the details of the foregoing examples. For instance, the read out need not necessarily be recorded by a pen recorder but may be recorded by other suitable means such as on punched tape or more suitably by direct input to a computer. In that case, at least in the arrangement of the first example when shown in the drawings, it will be appreciated that the count can be transferred into a computer very much more quickly than the stepping time of the drive system. Employing the FIG. 7 arrangement, the reset pulse would therefore have to be delayed sufficiently to allow completion of a step.

We claim:

1. Apparatus comprising a means for positioning an object, a detector means for receiving light from the object and for producing an electrical signal output comprising electrical pulses which are indicative of the intensity of light received by the detector means from a limited region of said object as it is approximately positioned near the detector means, drive means for causing step-by-step relative movement between the object and the detector means so that the detector means scans the object, and counter means for counting the steps to provide an indication of the position on the object of the said limited region from which the detector means is receiving light the said electrical signal output pulses defining a time interval which is related to the light intensity and provides the said indication thereof and means for receiving said output pulses to determine from said time intervals the said intensity.

2. Apparatus as claimed in claim 1, including a generator means for generating electrical pulses with a time interval less than the shortest time interval defined by the electrical signal pulses likely to be generated by the said detector means and means for measuring the time interval defined by the said electrical signal pulses by means for counting reference electrical pulses received from said generator of electrical pulses.

3. Apparatus as claimed in claim 2, including means for activating the drive means by electrical signal impulses for initiating a step movement.

4. Apparatus as claimed in claim 3, including means for initiating read out from a counter counting pulses from the reference pulse generator in response to each electrical signal pulse.

5. Apparatus as claimed in claim 1, including means for counting the number of said electrical signal pulses occurring in a predetermined time period to measure the inverse of the time interval defined by the said electrical signal pulses.

6. Apparatus as claimed in claim 5, including a means for generating a constant frequency electrical reference pulse, and wherein the time period comprises the time between pulses derived from said means for generating a constant frequency electrical reference pulse and wherein the reference pulse activates the drive means for initiating a step movement.

7. Apparatus as claimed in claim 1, including a light source and means for mounting a photographic plate between the light source and the detector means, whereby the apparatus is adapted to provide an indication of the exposed grain density of a photographic plate.

8. Apparatus as claimed in claim 1, including a nut on a lead screw, and wherein the drive means further comprises a stepping motor means for rotating said nut on said lead screw.

9. Apparatus as claimed in claim 8, wherein the said nut is coupled to the detector means for driving the detector means stepwise over a support for an object to be scanned.

10. Apparatus as claimed in claim 8, wherein the nut is coupled to a support for an object for driving the object step-wise relative to the detector means.

11. Apparatus as claimed in claim 1, including a temperature responsive means coupled to the lead screw and nut arrangement for compensating the movement against expansion/contraction effects of ambient temperature variations.

12. Apparatus comprising means for positioning an object, a plurality of detector means, each for producing an electrical signal output comprising electrical pulses which are indicative of the intensity of light received by the detector means from a limited region of said object as it is appropriately positioned near the detector means, drive means for causing step-by-step relative movement between the object and the detector means so that the detector means scans the object, counter means for counting the steps to provide an indication of the positions on the object of the regions from which the detector means are receiving light, and control means for activating the detector means in sequence at each step of the drive means, said electrical signal pulses of the detector means defining a time interval which is related to the light intensity and provides the said indication thereof and means associated with each said detector means for receiving said output pulses therefrom and determining from said time intervals the said intensity.

* * * * *